Feb. 16, 1965     M. SANDERS ETAL     3,169,765
IMPEDANCE TYPE PIN PRESENCE INDICATOR
Original Filed April 4, 1957
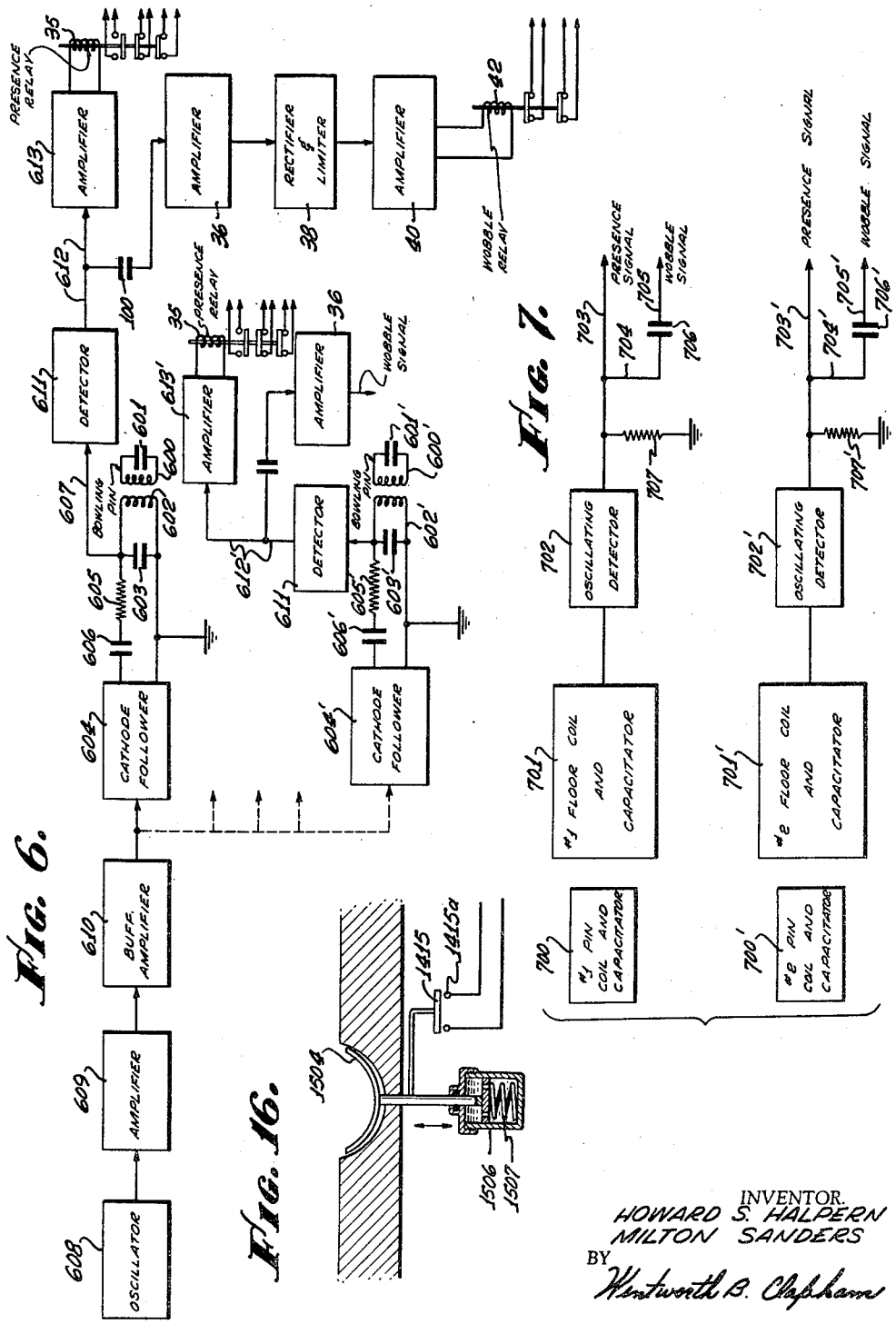

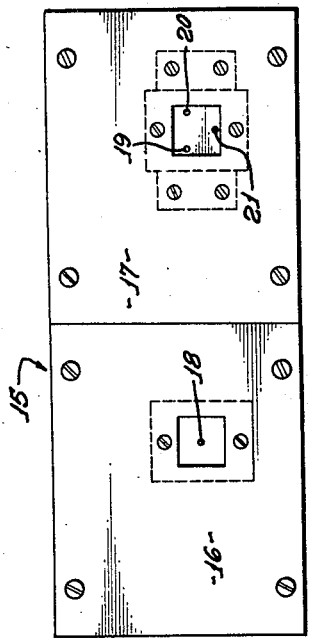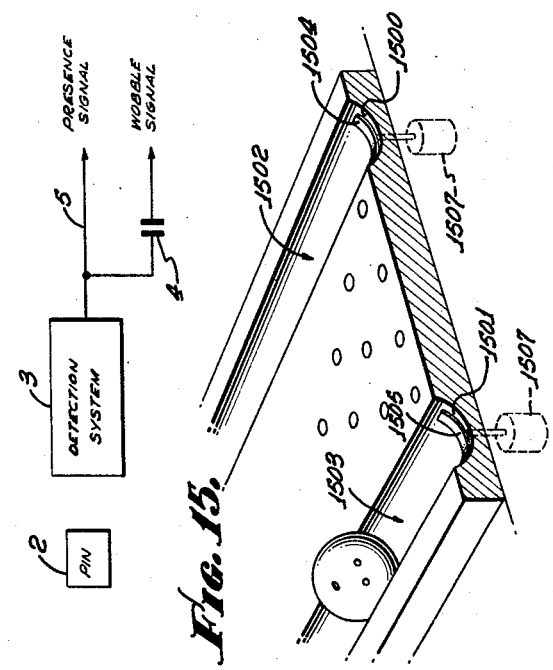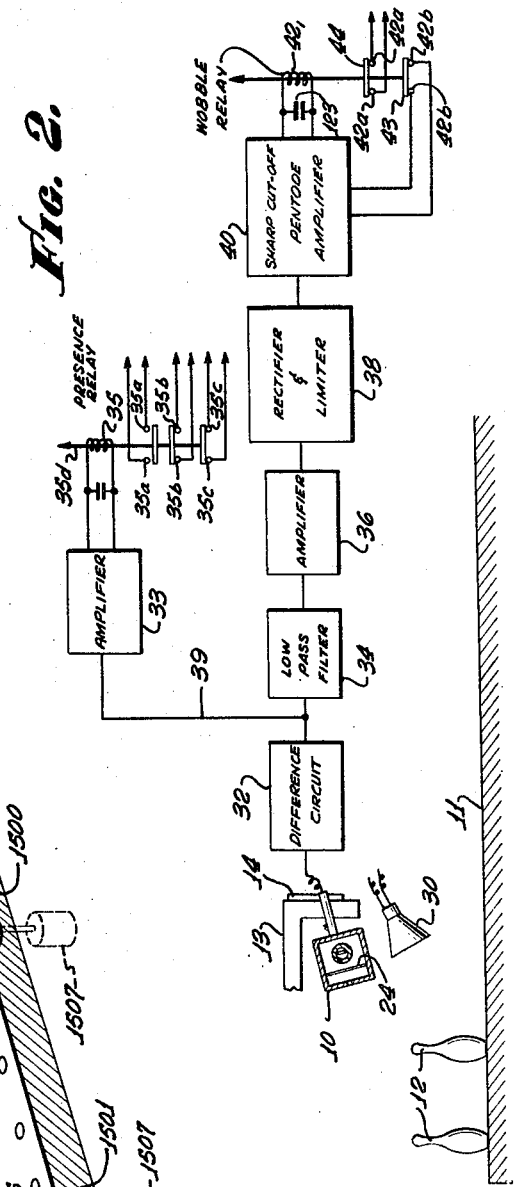

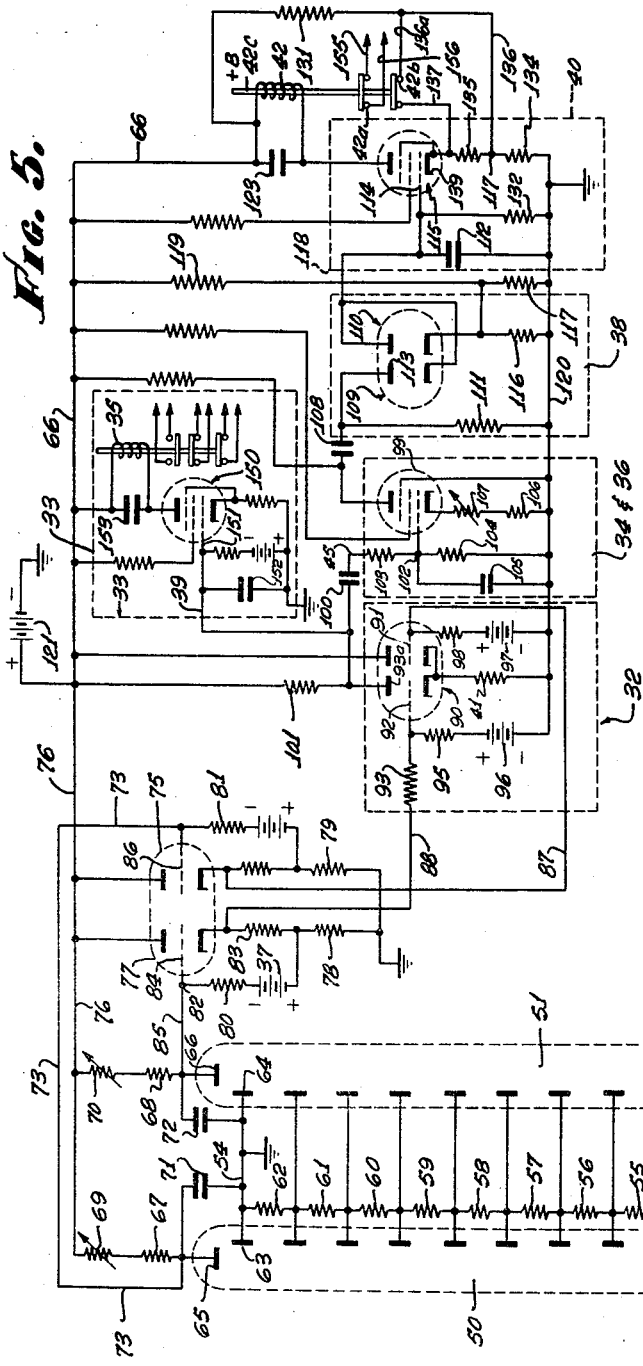
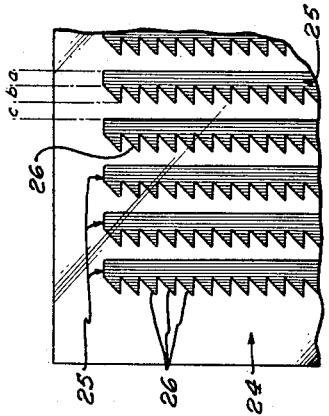

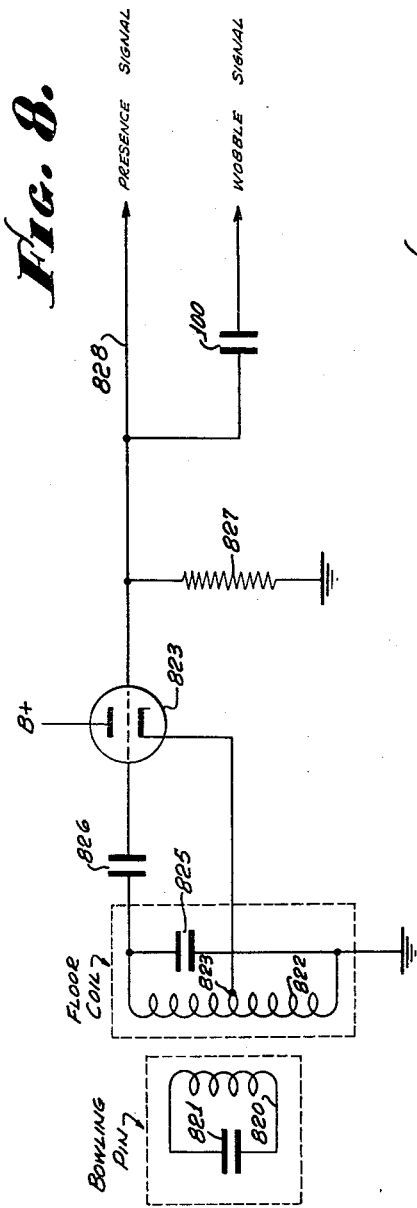
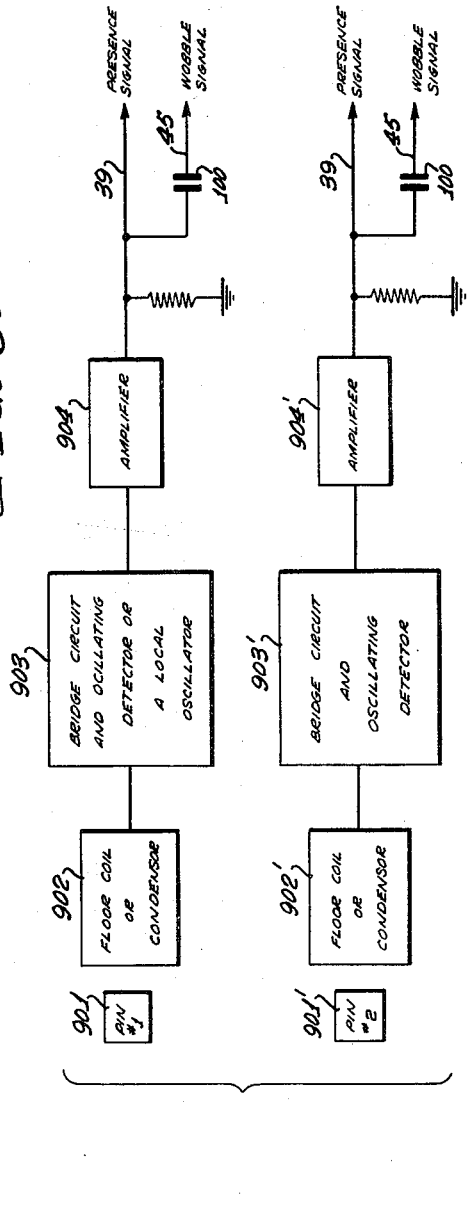

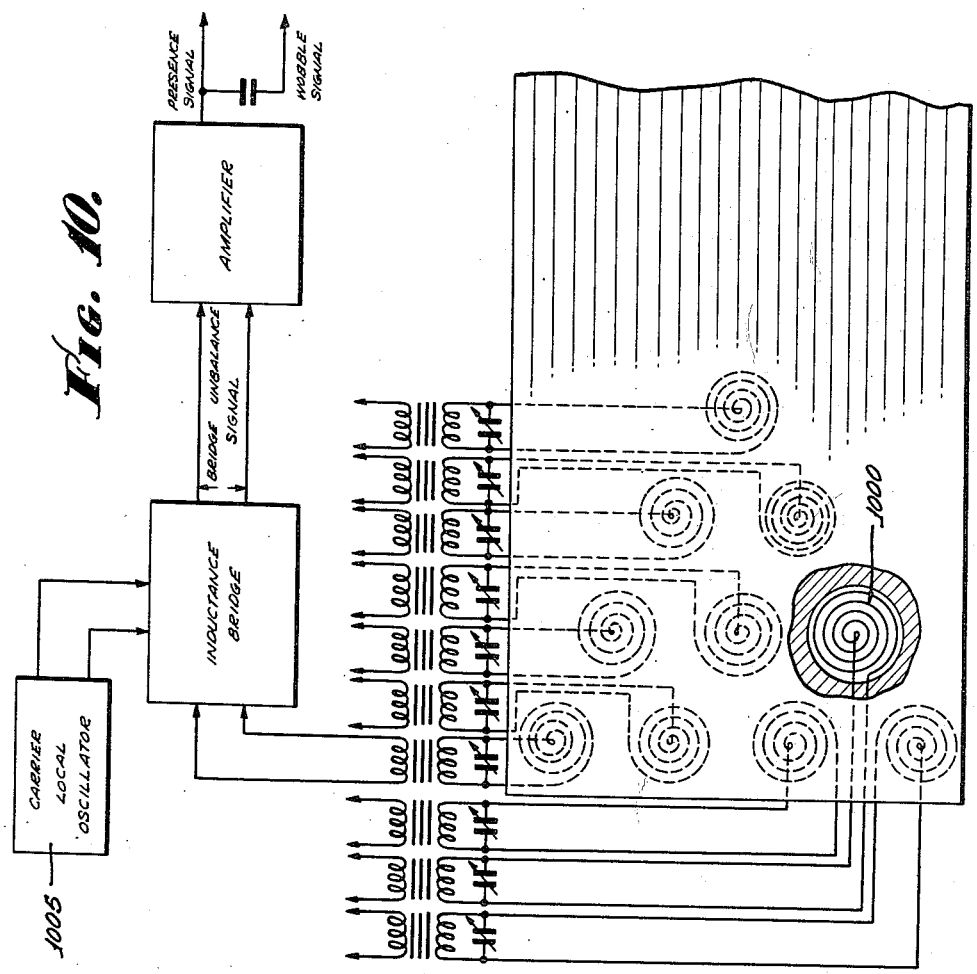

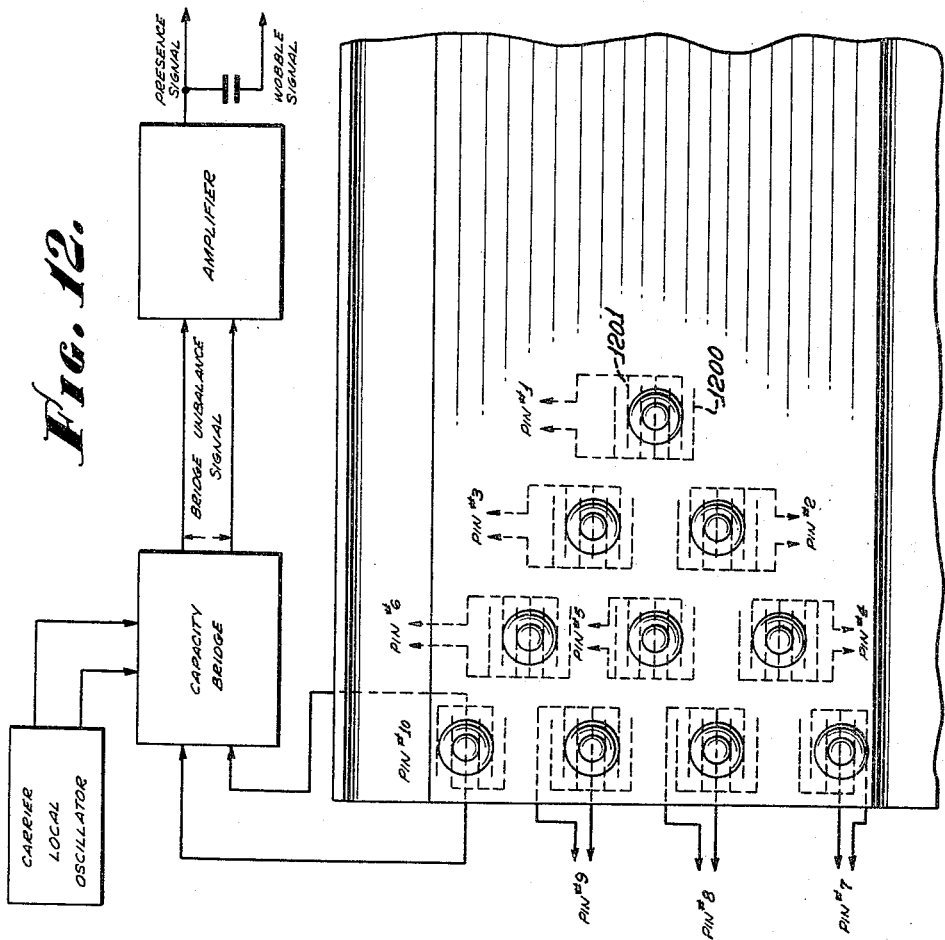
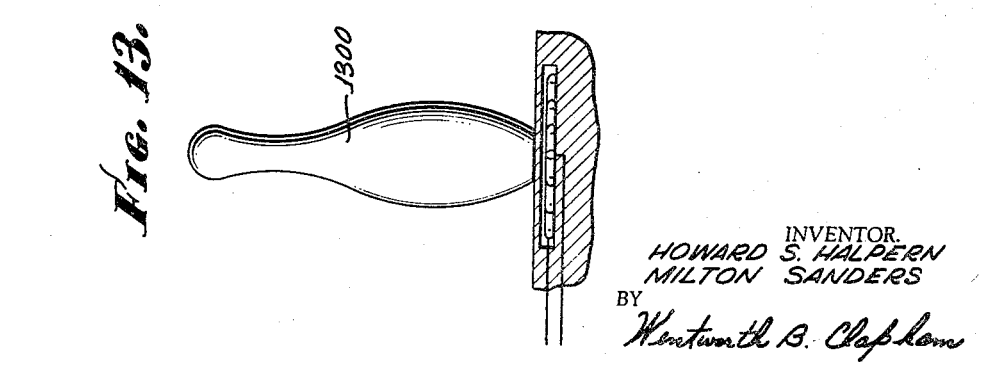

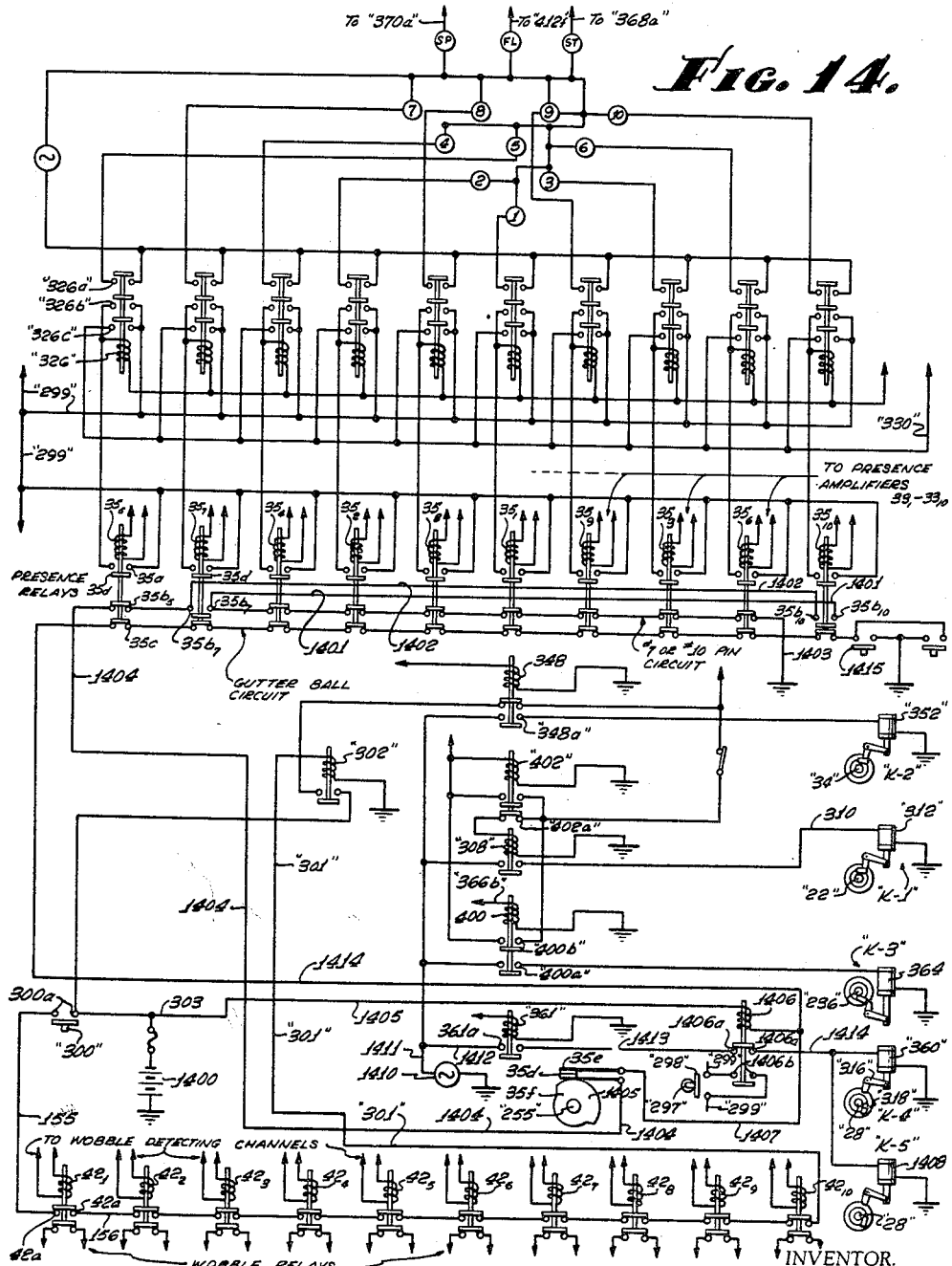

3,169,765
IMPEDANCE TYPE PIN PRESENCE INDICATOR
Milton Sanders and Howard S. Halpern, Stamford, Conn., assignors to American Machine & Foundry Company, a corporation of New Jersey
Original application Apr. 4, 1957, Ser. No. 650,634, now Patent No. 2,980,424, dated Apr. 18, 1961. Divided and this application Mar. 24, 1960, Ser. No. 17,283
3 Claims. (Cl. 273—52)

This invention relates to bowling pin-setting machines and more particularly to completely automatic bowling pin-setting machines in which the operations are electrically controlled in accordance with conditions arising in the course of playing of the bowling games. More particularly the invention relates to an automatic control of a time delay of a pinspotter by detecting pins in motion thus shortening the average pinspotter cycle by having time delays of the pinspotter variable rather than fixed at the maximum expected duration of pin motion, which is the case in the presently used pinspotters. The invention also includes novel pin fall detecting and signalling mechanism, which indicates the pin fall results after each ball of a frame is rolled. The invention also discloses a control system which prevents the normal, cyclic operation of the machine, and more particularly, the prevention of the operation of its pin-setting and resetting mechanism, when only pin #7 or pin #10 is knocked off the pin deck of the alley only by the first ball without knocking down any other pins, and allowing the normal operation of the machine if either pin #7 or #10 is knocked out by the second ball in any given frame. Knocking down of either pin #7 or pin #10 by the second ball, without knocking down any additional pins, can take place only when the first ball is a gutter ball which leaves all pins standing for the second ball, and rolling of the second then knocks out only pin #7 or #10. Under such conditions playing of the frame has been completed and, therefore, the disclosed system permits the normal operation of the pin-setting mechanism. In bowling pin setting machines, one of the main problems is to make all operations as quickly as possible, and to make these operations comply with the rules of the American Bowling Congress. Some automatic bowling machines now in use have a standard delay time for operating pin setting machines to prevent the operation of the machine while any of the pins are in motion. This delay time, as a rule, is equal to the maximum pin motion time that may be encountered in any play. However, there is a much larger number of plays which do not produce any pin motion, such as pin wobble, and, therefore, the maximum delay time built into the present machines is wasteful of time. This maximum delay time, as a rule, is derived from the maximum duration of a pin wobble that can take place without producing a pin fall. The pin wobble may be defined as an oscillation of a bowling pin around its vertical axis. This oscillation may be compared with an oscillation of a pendulum, except that while in the pendulum the center of gravity is below the point of pendulum suspension, in the pin wobble, the center of gravity of the pin is above the "point of suspension" which, in this case, is the alley floor supporting the pin. The pin wobble, as a rule, therefore, is in a single vertical plane with the pin first deflecting to one side and then to the other from its normal vertical position. The energy involved in pin wobble cannot exceed that required to tilt the pin from its normal upright position of stable equilibrium which is reached when the center of gravity of the pin is directly above the point of contact of the pin with the alley floor. If more energy is supplied to the pin than that required to tilt it to its condition of unstable equilibrium, the pin will fall over directly and not wobble. As the pin base becomes worn with use, the base edge becomes more rounded and the point of contact of the pin with the alley floor comes closer to the axis of symmetry of the pin. The position of unstable equilibrium is reached with a smaller tilt with the old pins, having worn out bases, than with the new pins. For a new pin, the maximum duration of pin wobble is about nine seconds and the maximum peak-to-peak motion of the pin head is about five inches. The fixed delay built into the pin-spotters is less than nine seconds because it is unnecessary to hold up the operation of the machine all full nine seconds even if the maximum possible amplitude wobble does occur. If the pin does not fall within the first maximum amplitude, it, obviously, will not fall as the amplitudes diminish. However, the operation of the machine cannot be started until the amplitude has died down sufficiently so as to produce proper engagement of the pin and the pin-sensing and "respotting" cups and avoid knocking down of the wobbling pin by premature lowering of the respotting cup. Moreover, the players do not wish to see the pinspotter go into operation until all wobble ceases, and the latter consideration, which is of purely psychological nature, requires the fixed time delay to be much longer than that required by the pin wobble itself. Usually this fixed time delay is of the order of 6 to 7 seconds. Since by far the larger number of plays do not produce any pin wobble, the operation of the pinspotter can be expedited considerably by making the time delay equal to zero when there is no wobble and variable when there is wobble, the actual duration of any specific delay being controlled by the wobble itself so that the delay is very short when there is only a slight wobble and longer when the wobble is more pronounced.

There are also present, at times, such pin motions as pin spin and pin roll. The path of the rolling pin is approximately an arc of a circle and the pin spin usually is transformed into a pin roll after the spinning pin loses some of its energy. The duration of pin roll is limited by the dimensions of the alley floor and the presence of other pins. The pin roll and pin spin cease in less time than that required for pin wobble to cease. Therefore, the duration of pin wobble rather than that of pin roll or pin spin, determines the maximum delay necessary in pinspotter operation.

In order to increase the intelligence of the detecting system still further it is also necessary for such detection system to provide a pin presence signal in addition to the pin wobble signal. With the pin wobble and presence signal made available by the detecting system, the following improvements in the operating cycle of the pinspotter become possible:

(1) Variable time delay for putting pinspotter into operation, this time delay being controlled directly by pin wobble so that this time delay is made equal to zero when there is no pin wobble.

(2) Elimination of sweep and table operation when only pin #7 or pin #10 is knocked out into pit by the first ball.

(3) Elimination of sweep and table operation when the first ball is a gutter ball, and when both balls are gutter balls.

(4) Direct operation of the pinfall signal means by the detection system.

The disclosed systems, described briefly, are as follows: one of the simplest systems is the system based upon amplitude modulation of the echo by a pin which is in motion. The simplest version of such system is the one using light as transmitters and photo cells as receivers. Amplitude modulation by pin wobble of the light reflected from a moving pin into the photo cell is such a system. A system of pin-hole "lenses" focus an image of the pin tops in the plane of patterned masks. The patterned masks (a grid having alternating transparent and non-transparent patterns) are so arranged that the transmitted illumination is a function of pin position with respect to the respective mask with a uniform light field illuminating the pins. The light transmitted through the mask is focused on a photo cell whose output will have a varying component corresponding to pin wobble. If only one photo cell is used for all ten pins, i.e., all ten pin images are focused on a single photo cathode, the resulting system will produce a wobble-and-presence detector which will not indicate the presence or absence of any individual pins. Individual pin wobble and presence is obtained by using a separate pin-hole lens and a separate photo cell to examine the image of each pin.

The additional versions of the systems all utilize an electro-magnetic phenomena for producing an electrical signal in response to a wobble and presence. Variations in the electro-magnetic or electrostatic fields unbalance electrical circuits to produce a modulated alternating current wave corresponding to wobble and a variable amplitude signal, or a change in the level of the signal to indicate pin presence. These signals, in turn, are used in the same manner as the signals from the photo-cathodes, for producing the desired effects in the relay system used for initiating the operating cycle of the pinspotter.

It should be stressed at this point that whatever the detecting system is, it must be capable of producing two types of signals, one for indicating wobble, and the other—and different type of signal—for indicating presence. These two types of signals are first produced in a common transducer and they are then separated from each other and directed to two separate control channels. The wobble signals control the operation of the wobble signal channel, and the presence signals control the operation of the presence signal channel. In the purely electrical detection systems, the transducer produces a modulated alternating current wave in response to wobble, and a change in the level, or amplitude, of the same alternating current wave in response to the absence of a pin. In order to have a clearer understanding of the terms "modulated wave" and "change in level," it may be helpful to say that the modulated wave signal is produced by using a pin wobble as a means for modulating a normally constant amplitude alternating current produced by some suitable source, such as a crystal-controlled oscillator. The degree of modulation is a function of the amplitude of the wobble; the larger is the wobble, the larger is the modulation. The presence of a pin, on the other hand, produces a constant amplitude signal having a constant amplitude "a" when the pin is present, and a constant amplitude "b" when the pin is absent with "a" being greater or smaller than "b." The wobble signal, produced by the above class of systems, shall be called as "the amplitude modulated signal," or the "A.M. signal" to correspond to the well-known, and identical, amplitude modulation used in radio, television and other forms of "A.M." communication systems, as differentiated from "F.M.," or frequency modulation systems. The presence signal shall be called "the level modulation signal" (L.M.) for lack of a better term. In the above term, the word "modulation" means the change in the level of the signal which takes place when the pin is removed from its normal standing position, i.e., knocked down. This change in level takes place at the moment the pin is knocked down.

When the transducer is an optical transducer, two types of signals, A.M. and L.M. are also produced but the "carrier" wave is a direct current carrier as differentiated from the alternating current carrier. Since direct current amplifiers are less stable than alternating current amplifiers, the A.M. and L.M. signals in the above type of system may be transformed in the electronic detection channels into A.M. and L.M. signals having an alternating current carrier for eliminating the use of direct current amplifiers.

This application is a division of my co-pending application, Serial No. 650,634, filed April 4, 1957, and now Patent No. 2,980,424.

It is therefore, an object of this invention to provide pin wobble and pin presence detection systems.

It is an additional object of this invention to provide purely electrical pin wobble and pin presence detection systems.

A further object of the invention is to provide a novel pin fall detecting device wherein pin fall is detected after each ball of a frame is rolled without the use of physical means being moved relative to a bowling alley to detect the presence or absence of standing pins on a bowling alley.

Still another object of this invention is to provide a transducer for converting the pin wobble directly into an amplitude-modulated electrical signal and the pin absence-and-presence directly into a level-modulated electric signal in the same transducer.

Yet another object of this invention is to provide an optical transducer in which the pin wobble is converted into amplitude-modulated light signal and the pin absence-and-presence is converted into a level-modulated light signal.

It is a further object of the invention to provide a pin fall detecting and signalling mechanism for use with a bowling pin for use with a bowling alley wherein there is generated a signal in the detecting system in response to the knocking down of a pin or pins normally standing on the pin spotting bed of a bowling alley, and wherein the pin fall results are made known to a bowler.

It is an additional object of this invention to provide an improved electrically controlled automatic bowling pin-setting machine having a control system capable of responding to and controlling the time of operation of the machine when there is a wobble of any pin, or, alternatively, preventing its operation when only pin #7 or pin #10 is knocked down by the first ball when all pins are present after ball #1 or ball #2 are rolled without knocking over any pins, which are known as "gutter balls."

It is a further object of this invention to provide an improved control system for an automatic bowling pin setting machine, the control system having electrically controlled means responsive to the presence, absence and wobble of pins after an impact of a ball on the bowling pins, and having a relay system capable of timing the operation of the machine in response to the pin wobble and pin presence signals.

Yet another object of this invention is to provide a pinspotter having a wobble-and-presence detector provided with a pin presence system capable of furnishing a visual display indicating the pins left standing after the first or the second balls are rolled in the course of a frame and to indicate strikes and spares.

The novel features which are believed to be characteristic of the invention, both as to its organization and method of operation, together with further objects and advantages thereof, will be better understood from the following description taken in connection with the accompanying drawings in which several embodiments of the invention are illustrated as examples of the invention. It is to be expressly understood, however, that the drawings are for the purpose of illustration and description only, and are not intended as a definition of the elements of the invention. Referring to the drawings:

FIGURE 1 is a block diagram of a wobble and presence detection system;

FIGURE 2 is a block diagram of an optical wobble-and-presence detection system;

FIGURE 3 is a front elevational view of the camera used in connection with the system illustrated in FIG. 2;

FIGURE 4 is a plan view of the viewing mask for the camera illustrated in FIGS. 2 and 3.

FIGURE 5 is a schematic diagram of the electronic channel of FIG. 2;

FIGURE 6 is a block diagram of an inductance pin wobble and pin presence detector system;

FIGURE 7 is the modified version of the inductance pin wobble and pin presence detector system disclosed in FIG. 6;

FIGURE 8 is a schematic diagram of the isolating detector used in the detection system disclosed in FIG. 7;

FIGURE 9 is a block diagram of a detection system using a bridge circuit;

FIGURE 10 is partly a schematic diagram and partly a block diagram of the detection system using an inductance bridge;

FIGURE 11 is a side view of a pin and flow coil used in conjunction with FIG. 10;

FIGURE 12 is partly a schematic diagram and partly a block diagram of the detection system using a capacitance bridge;

FIGURE 13 is a side view of a pin and capacitor mounted on the floor used in conjunction with FIG. 12.

FIGURE 14 is a schematic diagram of the relay system operated by the detecting systems.

FIGURES 15 and 16 illustrate a suitable type of gutter ball detecting mechanism.

*Basic components of the detection system*

Referring to FIG. 1, it discloses a simplified block diagram of a pin wobble and presence system for a single pin 2. When reflected light is used for detecting the wobble and presence of the pin, the pin needs no modifications of any kind. The light reflected by the pin produces the amplitude modulated light signal when the pin wobbles, and it produces the level modulated light signal when the pin is absent. These light signals are converted into the corresponding electrical signals by the detection system 3. The amplitude modulated signals (A.M.) are then separated from the level modulation presence signals in the detection system 3 and are impressed on a condenser 4 while the level modulation signals are impressed on a conductor 5. These two signals are then used to control the operation of a pinsetter in the manner pointed out in the introductory part of the specification.

When the detection system 3 is all electrical, or electronic, system, a standard pin, without any additional modifications within the pin itself, may be used when a capacitive coupling between the base of the pin and a capacitor mounted in the alley floor is used for converting pin wobble and pin presence directly into the A.M. and L.M. electrical signals. When the capacitive effect is replaced with the inductive effect, it is preferable to mount a small coil at the base of the bowling pins for increasing the useful magnitude of wobble and presence signals. The bowling pins of the above type are described more in detail in the co-pending U.S. application for patent of Milton Sanders having Serial Number 615,736, filed on October 11, 1956, now Patent No. 2,973,206, and entitled "Bowling Pin."

The above detection systems are described more in detail below, beginning with the description of the optico-electronic system.

*Optico-electronic detection system*

The block diagram of this system is shown in FIG. 2, the transducer including a pin-hole camera 10 is partly shown in FIGS. 3 and 4, and the schematic diagram of the detecting and signal-separating circuits is shown in FIG. 5. Accordingly, this system will be described in connection with FIGS. 2 through 5. The transducer, per se, which transforms mechanical movement of the pins, such as wobble and presence-absence, includes a source of light 30, pins 12, a pin-hole camera 10, and a mask 24 mounted within the camera. This optical transducer converts the pin wobble into an amplitude-modulated light signal and pin presence into a level modulated light signal. These light signals are focused on the photo-cathode 52 of a photo-cathode multiplier 50, FIG. 5, where the light signals are converted into electrical signals and the electrical signals are then used for controlling the operation of the pinspotter machine. FIGS. 1 through 5 illustrate only one optico-electrical detection channel for one pin; the overall system includes ten identical individual channels of the above type, one channel for each pin. Each channel furnishes information concerning the status of its pin in terms of wobble and presence and these signals are used for controlling the operation of the pinspotter. Only one wobble-and-presence channel is illustrated for simplifying the description and drawings.

Referring to FIGURE 2, it illustrates the relative position of camera 10 with respect to the alley floor 11 and pins 12. The most advantageous location for camera 10 is on an alley mask 13 directly behind the pinfall signal means 14. Camera 10 for pin #1 is in a vertical plane passing through the central, longitudinal axis of the alley, and the remaining cameras are positioned to the left and right of this camera. The cameras for the back row pins (7 through 10) are placed above the first row of cameras. Such positioning of the cameras produces reasonably uniform in size images of the pins, in the respective cameras, making the signals from the various pins more nearly uniform. The cameras, thus mounted will not be subjected to vibrations as they would be if mounted on the machine. An additional advantage of such mounting is that the camera is very unlikely to be hit by flying pins in this location.

Referring now to FIG. 3, it illustrates the front view of the camera. It is mounted in a box 15 having two identical front plates 16 and 17. Plate 16 is provided with a single pin-hole 18, while plate 17 is provided with three pin-holes 19 through 21. The pin-hole plates 16 and 17 constitute the front ends, or faces, of two independent cameras, one camera, with plate 16 and pin-hole 18 being used to focus the image of the upper portion (the upper rounded end) of some particular pin on a mask 24, FIG. 4, while plate 17 and pin-holes 19, 20 and 21 are used for focusing the general background alley illumination on the photocathode used for compensating the detector against any fluctuations in this illumination. Mask 24 is mounted on a metallic bracket (not shown) which supports the mask approximately three quarters of an inch behind the pin-hole plate 16. Only one mask is used in one of the cameras, such as camera 16 which is used for detecting pin wobble and pin presence. The illumination compensating camera 17 does not require the use of any mask. Mask, or grid, 24 is made of transparent base material, such as glass or cellulose acetate film, with a non-transparent grid pattern 25 superimposed on the transparent base. The preferred version of the grid pattern, which was found to produce maximum amplitude variations, consists of a saw-tooth wave 26, projecting beyond the straight strips. It has been found experimentally that such pattern produces the most uniform amplitude signal from all the pins located in various positions, and no pin in the field of view of the camera and the grid can move in any manner without a change in the intensity of the light transmitted through the mask. Thus there is no problem of orientation of the mask with respect to the pin images. The widths of the opaque strips, clear strips and sawtooth edge are equal to each other. The sawtooth angle is 45°. The function of the sawtooth edge on the mask is to increase the signal produced by the foreshortening of the pin image as a pin wobbles back and forth toward and away from the camera. Versions of this mask with various scale factors are not critical as long as the mask is not so coarse as to permit a pin to wobble without part of its image moving out from behind an opaque strip into the sawtooth, or clear area, and not so fine as to lose signal strength. The marks are also scaled so that the width of the opaque strips at their narrowest points is made equal to the width of the incident image of the pin neck. In the illustrated version of the mask, the indicated dimensions "a," "b" and "c" are equal to each other. It is to be understood that this invention is not restricted to the above-mentioned configuration of the mask, and other patterns can be used successfully so long as the above basic considerations are kept in mind.

The pinhole camera 10, illustrated in FIG. 2, uses a pinhole in each camera for detecting the pin wobble and presence. A pinhole lens, sufficiently small to resolve the head of a bowling pin (in one example the pin holes were .03 inch in diameter), admits sufficient amount of light to permit operation of the detector with a reasonably simple and inexpensive photomultiplier circuitry. A pinhole lens is simply a hole, of a proper size and placement, drilled in a sheet of opaque material. The pinhole lens, in addition to its obvious advantage of low cost, also has a wide angle and provides an image of clarity, relatively independent of object distance because of an infinite depth of focus; thus the pinhole lens can be focused on the king pin or on the rear pin, and its field of view may be controlled by varying the distance between the pin hole and the photo-cathode. Three pinholes are used in camera 17 illustrated in FIG. 3 in order to obtain a better integration of the overall background illumination.

The sensitivity of the photomultiplier tube is not uniform over the cathode surface, but is highest in the central region and drops rapidly toward the edges of the cathode. This is probably due to a higher multiplication being obtained with electrons leaving the central portion of the cathode than from those leaving the cathode edges. In order to obtain a reasonably good signal uniformity from all the pins, all individual pin cameras should focus the pin heads on the central portion of the photo-cathode.

All of the components of the detector and the source of illumination 30 are energized from an alternating current source, which is used for providing electrical energy for actuating all the detectors, the lights and the motors used in connection with pinsetters. Whenever a sudden load is connected to the source, it is apt to produce either transients or variations in the magnitude of such voltage, or both, which are apt to influence proper operation of the detectors. In order to cancel the effect of such transients and fluctuations in the intensity of illumination, the detector is provided with the compensating viewing head, or camera, 17 illustrated in FIG. 3, which is identical to the viewing, or camera, 16 used for producing the wobble signal except that it has three pinholes 19–21 and no mask. A photomultiplier is also mounted in the back of the viewing head 17 to convert the light passing through the pinholes into an electrical signal which compensates for any voltage fluctuations. Accordingly, head 17 produces a signal which is proportional to the intensity of illumination, but it is nonresponsive to the wobble, rolling or spinning of the pins. In view of the absence of mask 24 in head 17, some difference in the overall intensity of illumination will generally occur when some of the pins are spinning or rolling and such signal, as a rule, will also be converted into an electrical signal. These signals have a sufficiently low amplitude and, therefore, do not affect the operation of the pin setting machine.

The outputs of the two photomultipliers are connected to a difference circuit 32, the output of which produces a wobble signal and a presence signal. These signals are used for timing the operation of the pinsetter. The effect of light intensity fluctuations, therefore, is substantially cancelled out because both cameras are equally affected by the random fluctuations in the intensity due to voltage fluctuations. The photomultiplier load resistors are adjusted to equalize the anode voltages in the two viewers, with all pins standing. Complete compensation of light changes occurs only when all pins are standing. However, the useful signal has a sufficiently large amplitude for practical purposes.

In order to minimize the effect of the line voltage on the entire detector still further, it is desirable to use a regulated voltage supply which uses voltage regulator gas filled tubes. Such regulated voltage supplies are well known in the art and, therefore, need no further description.

The output of the difference circuit 32 produces two signals: one signal is the amplitude modulated signal corresponding to the pin wobble, and the second signal is the level modulated signal corresponding to pin presence and absence. These are the previously mentioned A.M. and L.M. signals. The two signals are both impressed on a presence amplifier 33 where the wobble signal is filtered out so that only the L.M. presence signal has any effect on a pin presence relay 35. The functions performed by this relay will be described later in connection with the description of the relay system shown in FIG. 14.

The A.M. wobble and L.M. presence signals are also impressed on the wobble signal channel which begins with a low pass filter 34, where higher frequency components than those encountered in pin wobble are effectively discriminated against by this filter. This filter, together with other filtering elements, such as the low pass filter in the photomultiplier circuit mounted in camera 31, limit the bandpass characteristics of the circuit so that the only spurious signals which can affect the pin wobble detector, are those with frequency components similar to those produced by pin motion. The effects of long term changes in illumination for example, are filtered out by coupling capacitors in the wobble signal channel, while very rapid transients are removed by the low pass filters. The output of the low pass filter 34 is impressed on an amplifier 36, and then on a rectifier and limiter circuit 38 the output of which is impressed on a sharp cutoff pentode amplifier 40. The output of pentode 40 energizes a relay 42, which has armatures 43 and 44. Armature 43 is used for controlling the operation of the pentode, while armature 44 is used for timing the operation of the pinspotter in the manner which will be described later in connection with the description of the relay system shown in FIG. 14. Relay 42 will be called the wobble relay because it becomes energized in response to pin wobble. As will be pointed out later, the normally closed contacts 42a of ten wobble relays are connected in series with the main relay of the pinspotter and, therefore, the pinspotter relay is energized immediately if there is no wobble or its energization is delayed as long as any of the ten pins continue to wobble. The very moment wobble ceases, relay 42 becomes de-energized, the circuit of the main pinspotter relay becomes closed, and the pinspotter is put into operation. Accordingly, the operation of the pinspotter is controlled by the wobble relays 42. There is an instant starting when there is no wobble, the length of the delay being controlled by the wobbling pin.

Referring to FIG. 5, which is the schematic diagram of FIG. 2 up to and including relay 42, the photo-multiplier 50 is the masked photo-multiplier, while photo-multiplier 51 is the compensating photo-multiplier. The light sensitive photo-cathode 52 receives the wobble and the presence signal and the average illumination signal, while photo-cathode 53 receives only the average illumination signal furnished by the pinholes 19, 20 and 21 of camera 17. The respective dynodes of the two photo-multipliers are connected to the respective common resistors 55 through 62. The dynodes 63 and 64 are grounded through a grounded conductor 54. The anodes 65 and 66 are connected to a positive source of potential 121 through a conductor 76, fixed anode resistors 67 and 68 and variable resistors 69 and 70, respectively. The cathodes 52 and 53 are connected to the negative terminal of a high source of potential 74, while the positive terminal of this source is grounded. Condensers 71 and 72 are also connected to the respective anodes on one side and to ground on the other side. Condensers 71 and 72 act as low pass filters and serve to reduce the 120 cycle per second signal which is the modulation signal appearing on the anode due to the double line frequency ripple produced by the alley illumination. These condensers also reduce the anode modulation, which in turn reduces the linear dynamic range required of the difference circuit operated by the photo-multipliers. The variable resistors 69 and 70 are adjusted, so as to make the two anodes 65 and 66 at the same potential with respect to ground when the pinholes in two cameras are open and the pins are standing on the alley floor.

Since the corresponding dynodes of both photo-multipliers are connected together to the taps on the chain of the common resistors 54 through 62, some crosstalk signal is produced because of the use of the common dynode resistors; this crosstalk signal is largely cancelled out in the difference circuit and does not significantly affect the overall operation of the pin wobble detector. A further reduction in the crosstalk can be obtained by providing an independent chain of resistors for the photo-multiplier 51.

The output of the photo-multiplier 50 is connected through a conductor 73 to the grid of a triode 75, while the output of photo-multiplier 51 is connected through a conductor 85 to grid 84 of a triode 77. Triodes 77 and 75 are conventional cathode follower impedance multiplier stages, and are identified as such by the fact that one terminal of the grid resistance 80 is connected to a tap 82 on the cathode load resistance 78–83 through a biasing battery 37. Resistance 78 is a high resistance as compared to resistance 83. The direct current impedance seen from grid 84 to ground is several times the value of the grid resistance 80. The same is also true of grid 86 and its circuit. Moreover, the impedance multiplying circuit has a high input impedance and, therefore, does not reduce greatly the photo-multiplier signals by shunting them to ground. The cathode followers 77 and 75 have low output impedance and, therefore, long leads 87 and 88 can be run from the cathode followers to the remainder of the circuit which is mounted outside of the camera box 15. These leads are connected to the difference circuit 32 which includes a double triode 99 having its cathode connected to a common cathode resistor 41. Grid 92 is connected through conductor 88, resistances 93 and 95 and a biasing battery 96 to the cathode of triode 77, while grid 91 is coupled to the cathode of triode 75 through conductor 87, grid resistor 98 and a biasing battery 97. Grid 92, therefore, receives only the signal which represents the intensity of illumination and variations in the intensity of illumination due to the voltage fluctuations, while grid 91 receives the signal proportional to the intensity of illumination, and the variations in the illumination, the wobble signal, and the presence signal. The difference circuit, as its name implies, has an output proportional to the difference of the signals from the two impedance multipliers. The difference circuit output is thus proportional to the difference in the two signals produced at the two photo-multiplier anodes. When the intensity of illumination fluctuates, corresponding to a line voltage fluctuation, approximately equal signals are produced at the two photo-multiplier anodes, and the output of the difference circuit is very small. When the pin moves, however, the signal produced at the anode 65 of the masked photo-multiplier 50 is very much larger than that produced at the compensating photo-multiplier anode. It is also of different algebraic sign in a random fashion. A detailed description of the difference circuit is not necessary because the circuit of this type is known in the art. Suffice it to say that the difference signal, corresponding to the wobble or presence signals, appears across a plate resistor 101. The positive signals impressed on grid 91 produce a positive signal on conductor 39, condenser 100 and the two cathodes. Plate 93A becomes more positive in response to the above because of the reduction in the space current. Therefore, a positive signal is impressed on conductor 39 and condenser 100. When grid 92 becomes positive, plate 93A becomes more negative because of the increase in space current and conductor 39 and condenser 100 receive a negative signal thus subtracting itself from the positive signal produced by grid 91.

The wobble A.M. signal and the presence L.M. signal both appear on conductor 39 and are impressed on condenser 100, which couples the wobble channel to the difference circuit, and on the control grid 151 of a pentode 150. The wobble channel, through its coupling condenser 100 and a low pass filter condenser 105, eliminates the presence signal and transmits the A.M. wobble signal for energizing the wobble relay 42. The presence channel, including pentode 150, shunts to ground the A.M. wobble signal through a capacitor 152, but the variable level signal, which may be regarded as a direct current signal, is impressed on grid 151 making pentode 150 more conducting. This increase in plate current energizes the presence relay 35. Relay 35 is shunted by a capacitor 153 which improves the operation of relay 35 by decreasing the difference between the currents which are necessary to energize and de-energize relay 35.

Reverting once more to the wobble channel, the wobble signal is impressed on the control grid of a pentode amplifier 99 through capacitor 100 and resistors 103 and 104. The grid resistor 104 is shunted by a capacitor 105 the value of which is made so as to act as a low pass filter to ground. In one example, resistor 104 had a value of 1 megohm, while condenser 105 has a value of 2 microfarads. Higher frequency components than those encountered in pin wobble are effectively discriminated against by this filter. This filter and the other filtered elements, such as condensers 71 and 72, limit the bandpass of the circuit so that the only spurious signals which can affect the pin wobble detector circuit are those with frequency components similar to those produced by the pin motion. The effects of long-term changes in illumination and the presence signals for example, are filtered out by coupling capacitors in the wobble signal channel while very rapid transients are removed by the low pass filters including condensers 71, 72 and 105.

The pentode 99 circuit, which is connected and operates as a Class A amplifier, includes a fixed cathode resistor 106 in series with a gain control potentiometer 107. The output of amplifier 99 is connected through a capacitor 108 to a detector and a limiter circuit including a twin diode 109 and 110. The detector 109 is connected across a resistor 111 and in series with a signal storage capacitor 112 so that only positive signals impressed on plate 113 make diode 109 conductive and, at the same time, charge up condenser 112 with the upper plate of the condenser, which is connected to the control grid 114 of a pentode amplifier 115, becoming more positive when diode 109 becomes conductive. Therefore, the wobble signals make pentode 115 conductive. The second diode 110 acts as a limiter of the positive signal impressed on grid 114 because it is connected across condenser 112 through resistors 116 and 117 and a conductor 118. The two resistors 116 and 117 act as potential divider resistors connected between grounded conductor 120 and a source of potential 121. When the voltage impressed on the plate of diode 110 becomes higher than the voltage impressed on its cathode by source 121, diode 110 becomes conductive and thus limits the potential that may appear across condenser 112 and, as a consequence, also limits the positive signal impressed on grid 114. Because of the limiter 109–110, the time delay between cessation of a very large signal and resumption of pinspotter operation is no longer than for smaller signals.

The output of limiter 110 is impressed on grid 114 of pentode 115 which has a circuit to produce sharp cut-off. Cathode 139 of this pentode is connected to ground through resistors 134 and 135 and a tap 117 between these resistors is connected over a conductor 136 to the normally closed contacts 42b of relay 42. The winding of relay 42 is connected in series with the plate circuit of pentode 115. The left contact 42b is connected directly to cathode 139 over a conductor 137 and armature 42d is on contacts 42b when relay 42 is not energized and it opens contacts 42b when relay 42 is energized. Therefore, with no wobble signal, the cathode resistor 135 is shunted by armature 42b' resting on contacts 42b; shunting of resistor 135 reduces the positive cathode bias on cathode 139 as long as relay 42 is not energized. When relay 42 becomes energized, the short circuit across resistor 135 is removed and it becomes connected in series with cathode 139. Therefore, the positive bias on cathode 139 is increased upon energization of relay 42 which decreases the magnitude of the grid signal required for de-energizing relay 42 and also decreases the difference in grid voltage between the level at which relay 42 is energized and that at which it is de-energized. The relay winding 42 is shunted by a capacitor 123 for eliminating contact chatter. Condenser 123 is also used for holding relay 42 energized if there is a momentary decrease in the wobble signals below a predetermined level by discharging condenser 122 through winding 120. Conductor 66 connects relay 42 to the positive terminal of source 121. Conductor 66 is also connected to conductor 136 through a resistor 131 for obtaining proper bias of pentode 115. A wobble signal, impressed on grid 144 is a positive signal and, therefore, it causes an increase in the space current, which causes a current increase through winding 42 and if this increase in current is sufficiently large, relay 42 will become energized. Normally tube 115 is non-conductive since grid 114 is at ground potential and cathode 133 is at some positive potential determined by the values of the resistors 134 and 131 which are connected across the power supply 121. Therefore, grid 114 is at a negative potential with respect to cathode 133.

The wobble relay 42 controls the time of closing of the pinspotter main relay 302 since contacts 42a and conductors 155 and 156 are connected in series with the main pinspotter relay, as will be described later in connection with the description of FIG. 14.

*Impedance pin wobble and pin presence detector*

The impedance type pin wobble detector belongs to the class of pin wobble detectors which requires the use of sensors, or detectors, in the alley floor. An impedance pin wobble and pin presence detector involves the measurement of the change in the impedance of a circuit. Looking into the sensors in the alley floor, such change in the impedance may be produced by using capacitors or inductance coils as sensing devices. The sensing system using inductance coils is more sensitive than that using the capacitors and will be described first and it will be followed with the description of the capacitive system.

In the inductance system, the pin wobble and pin presence signals are produced by a continuous measurement of the change in the coefficient of coupling between a coil mounted in the alley floor and a coil mounted in the base of a pin, and loading of the floor coil by the pin coil. In order to make this system as sensitive as possible, the two coils should be placed as closely as possible to each other. The floor coils and the coil in the base of the pin, nevertheless, should be recessed sufficiently so as to permit the insertion of an insulating layer of sufficient thickness which would protect the coils from ordinary wear and tear. The insulating material suitable for this purpose is the "Permabase" plastics material described in the U.S. Patents 2,739,814 and 2,680,023. A floor coil may consist of a suitable number of turns of wire with a capacitor connected across this coil to tune the circuit to the operating frequency with the pin removed from the alley floor. Although the frequency range of such system is not critical, the ultra high frequency (UHF) and the high frequency range is less desirable because the losses in the surrounding medium at these higher frequencies are larger than at the lower frequencies. On the other hand the audio frequencies would require large coils which are not suitable from the practical point of view. Accordingly, the range of frequencies which is most suitable for the systems of the above type is between 100 kilocycles and 2 megacycles.

When the pin is placed on the floor coil, connected to a source of carrier frequency, and wobbled, a modulated carrier signal is produced. The modulated carrier signal acts as an indication of pin wobble. Moreover, an increase in the amplitude of the carrier ("level modulation," mentioned previously) is produced when the pin is removed or knocked over because of the decrease in the losses produced in the floor coil by the pin coil. Accordingly, the amplitude modulated signal and change in the level of the carrier signal, may be used for obtaining an indication of pin wobble and pin presence, respectively. The wobble signal is obtained by detecting its amplitude modulation. The same detector can also be used to produce the carrier level output signal, which is the direct current output, for indicating the presence of any individual pin. A block diagram of such system is illustrated in FIG. 7. The circuits used in the inductance pin wobble and pin presence detector are known in the art and, therefore, no schematic diagrams of the circuits is necessary. However, suitable specific circuits will be mentioned in the course of the description of the block diagram, to identify the types of circuits which are capable of performing the intended functions in the optimum manner.

Referring to FIG. 6, a coil 600, or an electronically equivalent element, is installed in the base of a standard pin. Maximum useful signal is obtained if the pin coil is tuned to the frequency of the applied voltage. The output signal may be increased, for example, ten times since it is relatively easy to make Q, or the figure of merit, of the coil equal to at least ten. The pin coil may consist of enough turns of wire to tune it with the aid of a condenser 601 connected across the coil to the frequency of the oscillator used for producing the carrier frequency. Since each inductance coil has its own resonance frequency, it is also possible to use only a coil 600 without any use of condenser 601 so long as the coil is made resonant at the carrier frequency. Bowling pins of this type, provided with a single coil, or a plurality of turns and the electronically equivalent elements, are disclosed more fully in the previously mentioned Patent No. 2,973,206 which is made a part of this disclosure. The floor coil 602 and the condenser 603 are tuned to the same carrier frequency and the tuned circuit 602–603 is connected to a cathode follower 604 through a resistor 605 and a condenser 606. With the impedance looking into the tuned circuit from the cathode follower 604 being made equal to the output impedance of the cathode follower, a fifty percent change in the output voltage may be obtained in the output signal appearing on a conductor 607 when the pin coil is removed, i.e., when the pin is knocked over. It should be stated here that ten identical channels, one channel for each pin, are required with the system disclosed in FIG. 6, only two channels being illustrated in the figure. A single oscillator 608, such as a tuned grid oscillator, is used for impressing the carrier frequency on the ten tuned circuits. It is preferable to have a crystal controlled oscillator to avoid frequency drifts and the loss in the sensitivity of the circuits due to such frequency drifts. Oscillator 608 is isolated from the tuned circuits by interposing an amplifier 609 and a buffer amplifier, or a cathode follower, 610. The buffer amplifier 610 is connected to ten cathode followers 604 over a conductor 660 with each cathode follower 604 being connected to the respective floor coils 602. Oscillator 608 thus furnishes the carrier frequency to the ten tuned circuits. The output of the tuned circuits is connected over conductor 607 to a detector 611. The direct current output of detector 611 is connected over a conductor 612 to a direct current presence amplifier 613. The signal impressed on amplifier 613 represents the average level of the signal appearing in the output of detector 611. This average level is constant when there is no wobble and its level is modulated when there is a wobble. It increases greatly when the pin is absent.

The direct current presence signal (the previously mentioned level modulation signal) is impressed on a presence amplifier 613 through a metallic, direct current path by connecting the plate of detector 611 to the grid of the presence amplifier 613, the plate resistor of the detector also acting in such case as a grid resistor for the grid of the presence amplifier 613. Amplifier 613 corresponds to the amplifier 33 in FIG. 2 and pentode 150 in FIG. 5 and performs the same function as the above elements in FIGS. 2 and 5. The output of the presence amplifier 613 is connected to the presence relay 35 corresponding to the identically numbered relay in FIGS. 2 and 5. The operation and the control functions performed by relay 35 will be described later in connection with the description of FIG. 14.

The output of detector 611 is impressed on a wobble amplifier 621 which corresponds to the wobble amplifier 99 in FIG. 5 and amplifier 36 in FIG. 2. A low pass filter 34 may also be included in the wobble channel. In general, the wobble channel in this detection system is identical to the wobble channel 34, 36, 38, 40 and 42 of FIG. 2, and the same channel shown in schematic form in FIG. 5. Condenser 622 in FIG. 6, therefore, corresponds to condenser 100 in FIG. 5. The wobble relay 42 in FIG. 5, therefore, performs the same function as the wobble relay 42 in the prior figures.

One of the advantages of the system disclosed in FIG. 6 is that it uses only one oscillator 608 for producing a carrier frequency for all ten channels. At the same time, the use of one oscillator requires a careful tuning of the floor and pin coils 602 and 600 and capacitors 603 and 601. The system disclosed in FIG. 6 performs well once the tuned circuits in the pin and in the floor are properly adjusted. One additional factor which one should take into consideration in connection with FIG. 6 is that the length of the cable between the tuned circuit 602–603 and the cathode follower 604 causes the effective Q, or the figure of merit, of the floor coil to be lower than the measured Q of coil 602.

The operating characteristics of the system disclosed in FIG. 6 may be improved by providing ten separate oscillators with the floor coils themselves being the frequency determining elements by making these coils as an integral part of the oscillator with the oscillator and detector mounted in the center of the floor coil form. In this manner the length of the cable between the oscillator-detector and the coil is reduced to zero. Moreover, such construction is capable of increasing the signal level enough to make the precise tuning of the pin coils unnecessary.

The system of the above type is illustrated in FIGS. 7 and 8. FIG. 7 illustrates a block diagram of the circuit, while FIG. 8 illustrates the schematic diagram of a suitable oscillating detector circuit which can be used for producing the individual carrier frequency signal and detection of this signal in each individual channel. The performance of the system disclosed in FIG. 7 is superior to the performance of the system disclosed in FIG. 6, but it requires the placement of the oscillator detector circuit in the center of the floor coil form and requires ten oscillator-detectors. This disadvantage, however, is more than compensated by the superior performance of the system.

Referring to FIG. 7, the pin coil-capacitor combination 700 is coupled, as before, to the floor coil-capacitor combination 701 and the latter is connected to the oscillating detector circuit 702. The output of the oscillating detector is impressed on a conductor 703 to indicate the presence of the particular pin while the wobble signal appears on conductors 704 and 705 which are connected to each other through a capacitor 706. Identical elements are used in each channel for each pin and, therefore, there are ten channels altogether. A grounded resistor 707 is used as a grid leak and also as an output impedance of the oscillating detector circuit illustrated in schematic form in FIG. 8. Conductors 703 are connected to the individual presence amplifiers, such as amplifier 613 in FIG. 6, and amplifier 150 in FIG. 5, and the wobble signal, appearing on conductor 705, is impressed on the wobble signal channel identical to that shown in FIGS. 2 and 5. Conductor 705 and capacitor 706, therefore, correspond to conductor 45 and capacitor 100 in FIG. 5. The relay system operated by the detector circuits of FIG. 7 is identical to the relay system of the prior figures and that disclosed in FIG. 14.

FIG. 8 discloses the circuit of the oscillating detector which can be used in block 702 of FIG. 7. The oscillator is the Hartley oscillator. The pin coil 820 (with or without a condenser 821) is coupled as closely as practicable from the point of view of wear and tear to the floor coil 822 which has a tap 823 connected to the cathode of triode 824. Coil 822 is shunted by a condenser 825. The tuned circuit 822–825 is coupled to the grid by a capacitor 826. The grid is also connected to ground through a resistor 827. The presence and the wobble signals are impressed over a conductor 828 on the presence channel similar to that disclosed previously, and the wobble signals are impressed through capacitor 100 on conductor 45 which correspond to the identically numbered elements in the prior figures. When the pin coil is in the proximity of the floor coil 822, the overall Q of the tuned circuit is not as high as when coil 820 is absent. Accordingly, with the pin standing, the amplitude of the oscillator is not as high as with the pin absent and, therefore, the amplitude of the alternating signal appearing across resistor 827 is not as high with the pin standing as it is with the pin absent. When the pin is absent, the detector oscillator develops a large negative grid voltage appearing across resistor 827 and this signal is impressed on the outgoing presence channel. The wobble channel filters out such signals, through the coupling condensers and the low pass filters described previously and, therefore, the operation of the wobble amplifier 99, FIG. 5, is not affected by the presence signals.

The circuits disclosed in FIGS. 7 and 8 are thus capable of detecting the wobble and presence of the pins and, furnish two distinct signals, the amplitude modulation wobble signal and the level modulation presence signal, which can be separated in the electronic channels and then directed to the relay circuits of the type illustrated in FIG. 14 for controlling the operation of the pinspotter in the manner which will be described in connection with FIG. 14.

FIGURES 9 through 13 disclose additional versions of the inductance and capacitance pin wobble and pin presence detectors which use a Wheatstone bridge for detecting the wobble and presence signals produced by the individual pins. FIG. 9 is a block diagram for such systems. The base of pin 901 is provided with a coil or a coil-condenser combination if the Wheatstone bridge 902–903 is an inductance bridge. If the bridge is a capacitive bridge, the pin itself acts as a capacitive element and, therefore, conventional pins may be used without the insertion of any additional elements in the base of the pin. The bridge circuit is connected either to a local oscillator or an oscillating detector of the type shown in FIG. 8.

The output of the bridge is connected to an amplifier 904 which impresses its output on conductor 39, condenser 100 and conductor 45 corresponding to the identically numbered conductors in prior systems. Ten individual channels are required for continuously detecting the status of ten pins, one channel for each pin.

FIGS. 10 and 11 illustrate the inductance system using inductance coils 1000 in the alley floor and an inductive ring 1002 or a coil or a permeable insert at the bottom portion of pin 1003. In all cases the bridges are connected to a carrier source 1005 whose frequency may be in the range of 50,000 cycles per second and 2 megacycles per second as described previously.

FIGS. 12 and 13 illustrate a capacitive bridge detector, or transducer; in such transducer, metallic plates 1200 and 1201 are mounted in the floor of the alley in the manner illustrated in FIGS. 12 and 13 to form individual capacitors. In such case a pin 1300, may be a conventional pin with or without any metallic inserts in its bottom portion; the bottom portion can also be made of the plastic composition known as "Permabase" mentioned previously. In either case, wobble or absence of the pin produces an unbalance in the inductance or capacity bridges and this signal or signals are used for controlling the pin-spotter in the manner described below.

In summarizing the systems using an impedance bridge, the inductive systems require that a mass of permeable material, such as an electrically conducting ring or a coil, be placed in the pin bottom. In either case, motion of the pin changes the inductance of the coil placed in the floor, under the pin, and this change of inductance can be measured by using an alternating current bridge whose output is amplified and used to control the pin-spotter cycle. Such transducer furnishes the presence and the wobble signals and coil inductance is measured continuously. The absence of a pin causes a reduction in the amplitude of the signal, while a wobbling pin produces a modulated signal. The two types of signals are separated in the manner described previously in the two channels. The knocked-over pins will produce only a very small inductance change when rolling or spinning on the floor and, therefore, the systems of this type can be made to interrupt the pinspotter cycle when pins are wobbling without responding to the rolling or spinning pins.

The same is also true of the system using a capacitance bridge illustrated in FIG. 12.

*Relay system for controlling the operation of pinsetting machine*

The relay system for controlling the operation of a pinsetting machine is disclosed in FIG. 14. The disclosed relay system comprises the application of the pin wobble and pin presence detection system to the bowling pinsetting machines of the type disclosed in the U.S. Patent 2,559,274 dated July 3, 1951 which is made a part of this disclosure. There are now in use throughout the United States later versions of the machine distributed by the American Machine & Foundry Company the assignee of the above patent and of this application. The teachings of this invention are also applicable to the machines now in actual use which, for example, are described, in part, in "Product Engineering" June, 1954 issue, and Roger E. Dumas' application for patent S.N. 226,359, filed May 15, 1951, and now Patent No. 2,821,-395, the latter being also incorporated by reference as a part of this disclosure.

Since this invention uses several phases of the functional cycle of the machine disclosed in the U.S. Patent 2,559,-274, it is unnecessary to disclose here the overall structure of the machine; such structure is fully disclosed in the above patent and a more recent U.S. Patent 2,773,689 granted December 11, 1956. The same is also true of the relay system disclosed in FIG. 4 of the Patent 2,559,274, which discloses the overall relay system for controlling the operation of the entire machine. Accordingly, FIG. 14 in this application illustrates only the modifications in the relay system disclosed in FIG. 4 of the Patent 2,559,274 and the remaining elements of the overall relay system are omitted altogether. However, the functioning of the entire relay system will be apparent to those skilled in the art from the description of the modifications in the relay system appearing in Patent 2,559,274. In order to faciliate the understanding of the description of the relay system, and its relationship to FIG. 4 in Patent 2,559,274, those elements of the relay system of FIG. 4 of the patent, which are also shown in FIG. 14, bear the same identifying numerals as those used in the patent and such elements, for a more ready identification are put in quotation marks. For example, the pit switch "300" indicates that it is identical to the identically numbered switch 300 in FIG. 4 of the patent.

*Wobble system*

The operation of the wobble detecting systems has been described previously. It also has been stated previously that the wobble relay contacts 42a normally are closed and become open only when relays 42 receive wobble signals. Accordingly, these relays can control the starting time of the entire machine by connecting these ten wobble relays in series with the main relay "302" and the pit switch "300" in the manner indicated in FIG. 14. A source of potential 1400 is connected in series with conductors "301," 301a, wobble relay contacts 42a and the winding of relay "302." The circuit of the main relay "302" is as follows: grounded source 1400, pit switch "300," contacts 300a of pit switch "300," conductor 301a, normally closed contacts 42a of ten wobble relays $42_1$–$42_{10}$, conductor "301," and grounded winding of relay "302"; which closes the entire circuit through the grounded terminal of source 1400. The pit switch becomes closed immediately after it is struck by a ball; therefore, after switch "300" closes, the energization of the above circuit is controlled only by the ten serially-connected wobble relays 42. Accordingly, the entire cycle of the pinsetter is now controlled not only by the closing of the pit switch "300," as disclosed in the above patent, but also by the ten wobble relays $42_1$–$42_{10}$, any one of which is capable of delaying the operation of the machine until the wobble ceases, whereupon the affected relays 42 become de-energized, contacts 42a become closed, and the operation of the machine takes place the very moment the wobble ceases. Relay "302," therefore, is a fast-acting relay as differentiated from the delayed closing relay 302 in the above patent. Once the relays 42 are all closed, when all wobble ceases, the machine is allowed to operate without any other delay. When there is no wobble, the machine is permitted to operate immediately after ball strikes pit switch "300" and the fast-acting relay "302" is energized. The operation of the machine, from then on, is identical to that disclosed in the above patent with the modifications which are pointed out below, and which are caused by the prevention of its normal operation.

(1) When the first ball is a gutter ball; when the first ball as well as the second ball are both gutter balls;

(2) When only pin #7 or pin #10 is knocked down by the first ball, and all other pins are standing.

From the above description of the wobble relay circuit, it follows that the initial starting of the machine is now controlled by the pit switch 300 as well as ten wobble relays 42. There is an instantaneous starting of the machine when there is no wobble after the first or the second ball or any other ball, and a variable delay starting if there is a wobble, in which cases the machine is started immediately after the wobble ceases.

*Pin presence system*

The pin presence signal is impressed on a direct current amplifier 33, FIG. 2, and then a pin presence relay 35, which is provided with three sets of contacts 35a through 35c all mounted on a relay armature 35d. The normal position of this armature, corresponding to the bowling pin standing on the alley floor, is that illustrated in FIGS. 2, 5, 6, and 14. Contacts 35a are open and contacts 35b and 35c are normally closed with the exception of contacts 35b on relays $35_7$ and $35_{10}$, which are normally open and are connected in parallel by means of conductor 1401 and 1402. All the remaining contacts 35b are normally closed with the pins standing and are connected in series with each other and conductors 1401 and 1402. Conductor 1403 is grounded and conductor 1404 is connected to cam-operated contacts 35d and 35e which are closed and opened by a cam 35 having the contact-closing portion 1405 extending over approximately 160°–170° of the cam 35f. Cam 35f is keyed to a shaft "255" corresponding to the similarly numbered shaft in the patent. It is the electrical control cam shaft on which all electrical control cams are mounted, as described in col. 8, lines 62–75 and col. 9, lines 1 and 2 of Patent 2,559,274. As stated in the above description, the control cam shaft "255" makes only one revolution for every two revolutions of the main cam shaft "28" and is driven by shaft "28." The control cam shaft "255" makes one revolution for every two balls, and one half of a revolution for the first ball and the remaining one half revolution for the second ball. Contacts 35b of the presence relays 35 are that set of contacts which are used for eliminating the operation of the pinsetting machine when only pin #7 or pin #10 is knocked out by the first ball and all other pins remain standing. As mentioned previously, it is unnecessary to lower the table and reset the pins under the above conditions since the remaining pins are standing in proper manner and positions and, therefore, are immediately ready for rolling the second ball. The series circuit which controls the operation of the machine under the above conditions is grounded source 1400, conductor 1405, winding 1406 of the relay having two sets of contacts 1406a and 1406b, conductor 1407, contacts 35e and 35d, which are closed during the first ball play, conductor 1404, closed contacts 35b and grounded conductor 1403. Contacts 35b remain closed as long as pins 1 through 6, 8 and 9 are standing and contacts $35b_7$ or $35b_{10}$ become immediately closed if either pin #7 or pin #10 is knocked down by the first ball. Closing of contacts $35b_7$ or $35b_{10}$ completes the circuit and this energizes relay 1406. When relay 1406 becomes energized, contacts 1406a open which prevents energization of the clutch relays "360" and 1408 which prevents the lowering of the table. Relay "360" corresponds to the similarly numbered relay in Patent 2,559,274 and, as described in the above patent, it is used for actuating clutch "K–4." This prevents engagement of clutch "K–4," and thereby prevents the setting of new pins but allows the machine to operate and return the ball to the player. The functioning of clutch "K–4" per se in the machine disclosed here is identical to the functioning of clutch "K–4" in the patent. The difference resides in the interposition of relay 1406 which prevents the actuation of relay 360 when only pin #7 or pin #10 is knocked out on the first ball and when the first ball is a gutter ball and the second ball is also a gutter ball. The circuits of all clutch relays, such as "K–1," "K–2," and "K–3," are identical to the circuits in the patent and, therefore, need no description. The circuit of clutch "K–4" differs only in one respect; i.e., an additional control relay 1406 has been connected in series with the following circuit: a grounded source 1410, conductors 1411, 1412, contacts "361a" of relay "361," conductor 1413, contacts 1406a, conductor 1414 and grounded winding "360." With the exception of relay 1406 and contacts 1406a, this circuit is identical to that in the patent and normally performs the same function as long as contacts 1406a remain closed. The circuitry and the functions performed by relay "361" remain the same as those in the patent.

Reverting once more to the electrical control cam shaft 255 and contacts 35e and 35d, it is necessary to include these cam-operated contacts in the circuit of relay 1406 because this relay should be operated by the closing of the contacts $35b_{10}$ or $35b_7$ only after the first ball of a frame has been rolled. Shaft 255 and cam 35f open contacts 35e–35d after the rolling of the second ball and thus permit the normal operation of the machine after the second ball even if only pin #7 or pin #10 is knocked down by the second ball and all the remaining pins are standing.

*Gutter balls.*—It has been stated previously that the disclosed relay system prevents needless operation of the machine when the first ball is a gutter ball and when the first and second balls are both gutter balls. The above is accomplished with the aid of the presence relays, their second set of contacts and two gutter switches which also control the operation of relay 1406 in the manner described below.

The second set of contacts of the presence relays $35_1$–$35_{10}$ are contacts 35c. All contacts 35c are normally closed as long as the pins are standing, and are connected in series with source 1400, conductor 1405, winding 1406, conductor 1414, contacts 35c, and two gutter ball switches 1415 and 1416, which are connected in series with contacts 35c and in parallel with respect to each other. Source 1400 supplies power to relay 1406 and energizes it when either the first ball or the first and the second balls are gutter balls. Accordingly, contacts 35c and gutter switches 1415 and 1416 control the operation of relay 1406 which is normally de-energized because of the normally open position of the two gutter ball switches 1415 and 1416. Operation of clutch "K–4," therefore, is also prevented when the first ball is a gutter ball and when the first and the second balls are gutter balls.

FIGURES 15 and 16 illustrate the type of gutter ball switches 1415 and 1416 which are suitable for performing the function assigned to them by the relay system. FIG. 15 illustrates the positioning of the switches at the inner ends 1500 and 1501 of the two gutters 1502 and 1503. The switches include collars 1504 and 1505 which are supported in an elevated position above the gutters by springs 1507 mounted in dash-pots 1506. The dash-pots, fitted with suitable fluid, furnish sufficient time delay to maintain the contacts 1415 closed for that period of time which is required for preventing energization of clutch "K–4" after the gutter ball strikes pit switch "300" and puts the relay system into operation for one cycle of operation required either after the first or the second balls of a frame.

From the description of the gutter ball circuits, it follows that it is made operative only if all the pins remain standing, all relays $35_1$–$35_{10}$ remain de-energized, and all contacts 35c remain closed. Opening of any contacts 35c, which takes place if any of the pins are knocked down, makes the gutter ball circuit ineffective, contacts 1406a remain closed, and the machine is allowed to operate in its usual manner, as described in Patent 2,559,274.

A single relay 1406 is used for controlling the operation of clutch "K–4" by the gutter ball circuit described above and also by the #7 or #10 pin circuit described previously. The two circuits are in parallel with each other and have independent contacts 35b and 35c on the presence relays 35. The gutter ball circuit is not affected by the operation of cam 35f and contacts 35e and 35d.

*Clutch "K–5."*—In the cycle of the pinsetting machine disclosed in Patent 2,559,274, the operation of the pin carrying grippers "68" of the transfer device "N" are moved by cam "128" back and forth once each cycle of the machine, as described in col. 10, lines 44–54. As also described in col. 7, lines 26–40 of the patent, the movement of table "T" to and from the pin supporting bed of the alley for setting and/or resetting pins is also effected by means of a cam "148" which is formed integrally with cam "128," both of these cams being mounted on a cam shaft "28." In order to preserve the function of these two cams in the normal operation of the machine described in the patent and also adapt their functioning to the modified cycle disclosed here, an additional clutch "K-5" has been mounted on shaft "28." This clutch, and its solenoid winding 1408, are identical to clutch "K-4." The circuit of solenoid 1408 is identical to the circuit of solenoid "360" of clutch "K-4," the two solenoids being connected in parallel to conductor 1414. Therefore, the two solenoids are operated at the same time and under the same conditions which produce the energization of solenoid "360." In view of the above, clutch "K-4" may be used for not only clutching and declutching cam "74" to and from shaft "28," but also for clutching and declutching cams 128 and 148 to and from the same shaft. Accordingly, the operation of the pin grippers "68" and the movement of table "T" is now also under control of the gutter ball circuit and #7 or #10 pin circuit; i.e., it is under control of the presence relays $35_1$–$35_{10}$ and gutter switches 1415 and 1416.

*Pinfall signalling*

The presence relays $35_1$–$35_{10}$ and their contacts $35a$ are also used for operating the pinfall signalling lights 1 through 10, FIG. 14, corresponding to the pin positions 1 through 10. In Patent 2,559,274, the pinfall signal lights are operated by means of respotting cups "112" which are provided with the switch actuating members "320" which are raised in respotting cups "112" and close contacts "321" and circuit "322–324." Closing of circuit "322–324" energizes relay "326" which closes contacts "326a," "326b," and "326c." The closing of contacts "326a" lights a signal lamp (1–10) corresponding to the position of the particular pin which remained standing. The pinfall signal relays "326" remain locked in for the remainder of the cycle, after which the light circuits are broken by the de-energization of relays "326" through the opening of cam contact "326a" (not shown in FIG. 14 but shown in FIG. 4 of the patent) mounted on shaft "255." De-energization of relays "326" extinguishes the pinfall signalling lights thus completing the pinfall signalling cycle for any given ball.

In the disclosed system, the information about the presence or absence of the pins is furnished by the presence relays 35 immediately after any particular pin is knocked down. When a pin is knocked down, the presence relay 35 corresponding to the knocked down pin becomes energized and contacts $35a$, corresponding to contacts "323" in the patent, become closed and the corresponding relay "326" becomes energized. From then on, the operation of the pinfall signalling means described here is identical to that in the patent. Accordingly, while in the patent the pinfall signalling mechanism is operated by the respotting cup "112," in this case the pinfall signalling mechanism is operated by the presence relays 35 directly. Therefore, the respotting cups "112" need not have any switches "320–323" according to this invention since they are replaced by the contacts $35a$ and armatures $35d$ of the presence relays 35.

*Contacts 1406b of relay 1406*

From the prior description of the functions performed by relay 35, it follows that relay 35 prevents the operation of clutch "K-4" when (a) only pin #7 or pin #10 is knocked down by the first ball, and (b) when the first ball is a gutter ball and when both balls are gutter balls. Since clutch "K-4," when energized, connects cam "74" to shaft "28," cam "74" remains inoperative and frame "M" and table "T" remain stationary as long as clutch "K-4" remains de-energized. Therefore, switch "298" also remains in its open position because switch "298" is closed by cam "168" only when the table reaches its lowermost or pin-engaging position, as explained in col. 7, lines 45–50 of the patent. In order to preserve the normal functions of the machine, even when operation of clutch "K-4" and lowering of table "T" does not take place because of the operation of relay 1406, relay 1406 is provided with contacts 1406b which close when relay 1406 becomes energized and by-pass switch "298."

What is claimed as new is:

1. In a bowling alley installation, a bowling alley having a pin supporting bed providing a plurality of pin supporting positions, a standing pin detecting system comprising a plurality of capacitive transducers each constructed for positioning at a different one of the pin supporting positions of the alley bed, means for supplying alternating current to each of said transducers, and means for deriving from each of said transducers an output signal the amplitude of which depends upon the capacitance of the transducer from which the output signal is derived; and pin fall signalling means connected to be operated by said output signals for indicating the pin fall result of each ball of a frame rolled, said transducers being so constructed and arranged that, when said transducers are positioned at the pin supporting positions of the alley bed below the surface thereof, the capacitance of each of said transducers is markedly different when a pin is standing at the pin supporting position at which the transducer is located than when the pin is absent.

2. In a bowling alley installation including an alley bed having a plurality of pin supporting positions; a plurality of bowling pins each adapted to be disposed on the alley bed at one of said positions, each of said pins having an inductive element mounted in the base thereof; a standing pin detecting system comprising a plurality of inductive coils each mounted in the alley bed at one of said positions, and electrical circuit means operatively connected to said coils for continuously monitoring the inductive coupling between each of said coils and the corresponding inductive element of one of said pins; and pin fall signalling means operated by said detecting system for indicating the pin fall result of each ball of a frame rolled.

3. In a bowling alley installation, a bowling alley having a pin supporting bed and a plurality of pin supporting positions, a standing pin detecting system operatively associated with said positions of said bowling alley, said detecting system including a plurality of electrical impedance means, means for detecting a variation in impedance in said detecting system in response to the knocking down of a pin or pins normally standing on the pin supporting bed, by each ball rolled down the alley against standing pins, and pin fall signalling means operated by said detecting system for indicating the pin fall result of each ball of a frame rolled, said pin fall signalling means including a plurality of signalling units, said impedance means each including a capacitive device mounted at one of said pin supporting positions in such manner as to present a markedly different capacitance when a pin is standing at said one position than when the pin is absent, said detecting system including means operative in response to a change in capacitance for operating selected ones of said signalling units corresponding to the pin spot position of each standing pin.

References Cited in the file of this patent
UNITED STATES PATENTS

| | | |
|---|---|---|
| 2,014,306 | Barker | Sept. 10, 1935 |
| 2,228,293 | Wurzbach | Jan. 14, 1941 |
| 2,338,733 | Patterson et al. | Jan. 11, 1944 |
| 2,492,182 | Robinson | Dec. 27, 1949 |
| 2,613,933 | Johns et al. | Oct. 14, 1952 |
| 2,628,098 | Bauerschmidt | Feb. 10, 1953 |
| 2,646,599 | Nutzler | July 21, 1953 |
| 2,697,605 | Montooth et al. | Dec. 21, 1954 |
| 2,782,406 | Krakora | Feb. 19, 1957 |